US007028367B2

(12) United States Patent
Sharabura et al.

(10) Patent No.: US 7,028,367 B2
(45) Date of Patent: Apr. 18, 2006

(54) WINDSHIELD WIPER HAVING REDUCED FRICTION CHARACTERISTICS

(75) Inventors: Scott D. Sharabura, Colleyville, TX (US); Michael E. Allen, Mineral Wells, TX (US); Jeannie Holmes, Weatherford, TX (US); Victor K. Paulsen, Mineral Wells, TX (US); Subramaniam Shanmugham, Fort Worth, TX (US)

(73) Assignee: M Management-Tex, Ltd., Fort Worth, TX (US)

( * ) Notice: Subject to any disclaimer, the term of this patent is extended or adjusted under 35 U.S.C. 154(b) by 535 days.

(21) Appl. No.: 10/313,346

(22) Filed: Dec. 6, 2002

(65) Prior Publication Data

US 2003/0165683 A1  Sep. 4, 2003

Related U.S. Application Data

(60) Provisional application No. 60/337,928, filed on Dec. 6, 2001.

(51) Int. Cl.
*A47L 1/02* (2006.01)

(52) U.S. Cl. .................. 15/250.001; 524/266; 524/268; 524/588; 525/104; 525/254; 525/477

(58) Field of Classification Search ..................... None
See application file for complete search history.

(56) References Cited

U.S. PATENT DOCUMENTS

| | | |
|---|---|---|
| 4,473,919 A | 10/1984 | Fritz, Jr. |
| 4,731,517 A | 3/1988 | Cheney |
| 4,852,204 A | 8/1989 | Wilson |
| 4,981,637 A | 1/1991 | Hyer |
| 5,107,563 A | 4/1992 | Zimmerman et al. |
| 5,283,927 A | 2/1994 | Gibbon et al. |
| 5,349,718 A | 9/1994 | Gibbon |
| 5,400,128 A | 3/1995 | Michlin |
| 5,478,605 A | 12/1995 | Ichise |
| 5,623,028 A | 4/1997 | Fitzgerald et al. |
| 5,641,831 A | 6/1997 | Hamilton |
| 5,716,699 A | 2/1998 | Reo |
| 5,767,185 A | 6/1998 | Reo |
| 6,004,496 A | 12/1999 | Reo |
| 6,077,592 A | 6/2000 | Azuma et al. |
| 2004/0249059 A1* | 12/2004 | Akbar et al. ................ 524/588 |

FOREIGN PATENT DOCUMENTS

JP  05-117530  5/1993

OTHER PUBLICATIONS

PCT International Search Report for International Application No. PCT/US02/39430 dated Mar. 27, 2003.
AUSIMONT; Algoflon Properties and Applications Selection Guide, Jul. 1999, 8 pages.
Abstract of Patent App. No. 93119903, entitled Method of Producing Wiper Blade Rubber and Wiper Blade Rubber Produced Thereby, published Apr. 7, 1999, see pps 3-4 of nerac.com Retro Search.
Abstract of Patent App. No. 87901997, entitled Powder Atomizing Methods and Apparatus, published Dec. 27, 1991, see pps 4-6 of nerac.com Retro Search.
Abstract of Patent App. No. 08169727, entitled Aliphatic Nylon Solution and Wiper Blade Coated Therewith, published Jan. 13, 1998, see pps 6-7 of nerac.com Retro Search.
Abstract of Patent App. No. 08172837, entitled Coating Composition for Wiper Blade Rubber, published Jan. 6, 1998, see p. 7 of nerac.com Retro Search.
Abstract of Patent App. No. 08146423, entitled Coating Composition for Repairing Wiper Blade Rubber, published Nov. 18, 1997, see pps 7-8 of nerac.com Retro Search.
Abstract of Patent App. No. 07298266, entitled Wiper Blade, published May 27, 1997, see p. 8 of nerac.com Retro Search.
Abstract of Patent App. No. 07267191, entitled Solder Paste Printing Squeegee, published Apr. 28, 1997, see pps 8-9 of nerac.com Retro Search.
Abstract of Patent App. No. 837891, entitled Mathod of Making a Silicone Rubber Windshield Wiper, Dec. 21, 1999, see pps 9-10 of nerac.com Retro Search.
Abstract of Patent App. No. 837754, entitled Moldable and Tintable Silicone Rubber Composition for Windshield Wiper Blade, Jun. 16, 1998, see p. 10 of nerac.com Retro Search.
Abstract of Patent App. No. 603920, entitled Silicone Rubber Windshiield Wiper Blade, Feb. 10, 1998, see pps 10-11 of nerac.com Retro Search.
Abstract of Patent App. No. 358567, entitled Method of Producing Rubber Wiper Blades, Dec. 26, 1995, see pps 11-12 of nerac.com Retro Search.
Abstract of Patent App. No. 101016, entitled Wiper and Spreader Blades with Conductive Coating, Mar. 21, 1995, see p. 12 of nerac.com Retro Search.
Abstract of Patent App. No. 584539, entitled Non stick Windshield Wipers, Apr. 28, 1992, see p. 13 of nerac.com Retro Search.

(Continued)

*Primary Examiner*—Marc S Zimmer
(74) *Attorney, Agent, or Firm*—Patton Boggs LLP

(57) ABSTRACT

A wiper blade made of a compound having a methyl vinyl silicone polymer, a filler, and a friction-reducing additive is provided. The friction-reducing additive is present in an amount from between about 5–42 weight percent, preferably 11 percent. The average particle size of the friction-reducing additive is preferably less than 6 microns, thereby permitting extrusion of the compound into the shape of a wiper blade. Polytetrafluoroethylene is preferred as a friction-reducing additive, but other substances, such as boron nitride or graphite could be used.

14 Claims, 6 Drawing Sheets

OTHER PUBLICATIONS

Abstract of Patent App. No. 112531, entitled Windshield Wiper Structure, Aug. 1, 1989, see pps 13-14 of nerac.com Retro Search.

Abstract of Patent App. No. 839284, entitled Powder Atomizing Methods and Apparatus, Mar. 15, 1988, see pps 14-15 of nerac.com Retro Search.

Abstract of Patent App. No. 05050875, entitled Window Shield System for Automobile, published Sep. 20, 1994, see pps 15-16 of nerac.com Retro Search.

Abstract of Patent App. No. 03311899, entitled Silicone Rubber Composition for Wiper Blade, published May 14, 1993, see p. 16 of nerac.com Retro Search.

Abstract of Patent App. No. 63229588, entitled Wiper Blade, published Mar. 16, 1990, see pps 16-17 of nerac.com Retro Search.

Abstract of Patent App. No. 62215594, entitled Manufacture of Chip Type Solid Electrolytic Capacitor, published Mar. 6, 1989, see p. 17 of nerac.com Retro Search.

Abstract of Patent App. No. 58134257, entitled Windshield Wiper for Automobile, published Feb. 8, 1985, see pps 17-18 of nerac.com Retro Search.

Abstract of Japanese Patent App. No. 10-338003, Publication No. 2000-160019, entitled Silicone Rubber Composition for Wiper Blade, published Jun. 13, 2000.

Abstract of Japanese Patent App. No. 03-311899, Publication No. 05-117530, entitled Silicone Rubber Composition for Wiper Blade, published May 14, 1993.

\* cited by examiner

WINDSHIELD WIPER HAVING REDUCED FRICTION CHARACTERISTICS

CROSS-REFERENCE TO RELATED APPLICATIONS

This application claims the benefit of U.S. Provisional Application No. 60/337,928, filed Dec. 6, 2001, which is hereby incorporated by reference.

BACKGROUND OF THE INVENTION

1. Field of the Invention

This invention relates generally to windshield wipers and in particular to windshield wipers having a silicon rubber wiper blade that incorporates PTFE.

2. Description of Related Art

Rain, sleet, and snow have always presented a vision problem for the driver of a moving vehicle. The windshield wiper blade has attempted to minimize the problem by clearing the windshield of the light obstructing moisture and debris. Such blades are typically formed of rubber or rubber-like materials. Over the years, wiper blades have been modified in many ways in order to enhance wipe quality and therefore visibility during precipitation. In some instances, the configuration of the blade has been changed to give a plurality of contact surfaces on the blade. Various modifications have been introduced to improve the consistency and integrity of the wiping edge.

Wiper designers have developed silicone-rubber-based wiper blades with some success. Silicone rubber is a superior material to natural rubber for several reasons. Silicone rubber, i.e., high molecular weight, vulcanizable polydiorganosiloxane, is able to withstand wide temperature variation without an appreciable effect on its physical properties. Further, silicone rubber is virtually unaffected by ultraviolet radiation, even over long periods of time. It is also resistant to ozone, oil, salt, water and other road and automotive chemicals.

Silicone rubber as used for wiper compositions has had one significant drawback: it has an unacceptably high coefficient of friction with respect to glass. Some of the early silicone wiper blades exhibited such a high coefficient of friction that the wiper blades could tear loose from the wiper frame when wiping the windshield. Less catastrophic effects of this high coefficient of friction include an unacceptably loud squeak or chatter as the wiper traverses the windshield, and unacceptably high loads on the windshield wiper motor. The silicone wiper blades produced today have improved significantly but wiper designers continually search for improved solutions that would reduce the friction between the wiper blade and the windshield.

Polytetrafluoroethylene (PTFE) has been used in conjunction with wiper blades in an attempt to decrease friction between the wiper blade and the windshield. However, the wiper blades are typically coated with PTFE after the blade is cured. Coating a cured blade with PTFE is less than desirable because the PTFE will wear off over time, thereby reducing the improved frictional characteristics of the wiper blade.

Japanese Patent Application No. Hei 5[1993]-117530, by Hiroshi Honma, (the "Honma Application") describes compounding a fluoro resin powder from 0–10 parts by weight with a silicone rubber formulation for wiper blades. The application teaches that the formulation provides excellent climate resistance and causes no vibration or squeaking. Fluoro resin powder, such as PTFE, is added to the compound in a preferable amount of 1–10 parts by weight, and an average particle size of 40 µm. As described in more detail below, the primary problem with compounding PTFE as described in the Honma Application is that the particle size of the PTFE hinders the manufacturability of the compound. Larger particle sizes of PTFE tend to increase the plasticity of the silicone rubber compounds, which reduces the ability to extrude the compound, and in some cases the ability to mold the compound.

A need therefore exists for a windshield wiper blade made of a silicone rubber compound that provides excellent friction characteristics when wiping a windshield. The reduced friction characteristics of the wiper blade will preferably allow a significant reduction in the force required to move the wiper blade across the windshield and will reduce the amount of chatter, squeaking, jumping, and other noise inducing and performance reducing actions associated with current wiper blades. A need further exists for a windshield wiper blade having these properties that is simple and inexpensive to manufacture. Preferably, the materials used in the wiper blade compound will be readily available and inexpensive. Finally, a need exists for a wiper blade compound that has a relatively low plasticity, thereby allowing the compound to be easily formed by a variety of manufacturing methods, including extrusion.

BRIEF SUMMARY OF THE INVENTION

The problems presented by existing silicone wiper blades are solved by the present invention. A silicone wiper blade compound having a methyl vinyl silicone polymer, a filler, and a friction-reducing additive is provided. Preferably, the methyl vinyl silicone polymer is provided in an amount from about 22 to 55 weight percent, the filler in an amount from about 35 to 50 weight percent, and the friction-reducing additive in an amount from about 5 to 42 weight percent. A preferred friction-reducing additive is PTFE having an average particle size of less than 6 µm and being compounded in an amount of about 11 weight percent. Alternatively, boron nitride, graphite, or other friction-reducing additives could be used.

A windshield wiper having a wiper blade of the composition described above is also provided by the present invention. The wiper blade is attached to a frame which is adapted for attachment to a vehicle.

A method for making a wiper blade comprised of the above-described compound is also provided. The methyl vinyl silicone polymer is compounded with the filler and friction-reducing additive to form a wiper blade mixture. The mixture is then extruded and cured to form a wiper blade having any one of a variety of cross-sectional shapes.

Other objects, features, and advantages of the present invention will become apparent with reference to the drawings and detailed description that follow.

DETAILED DESCRIPTION OF THE PREFERRED EMBODIMENT

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical mechanical, structural, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
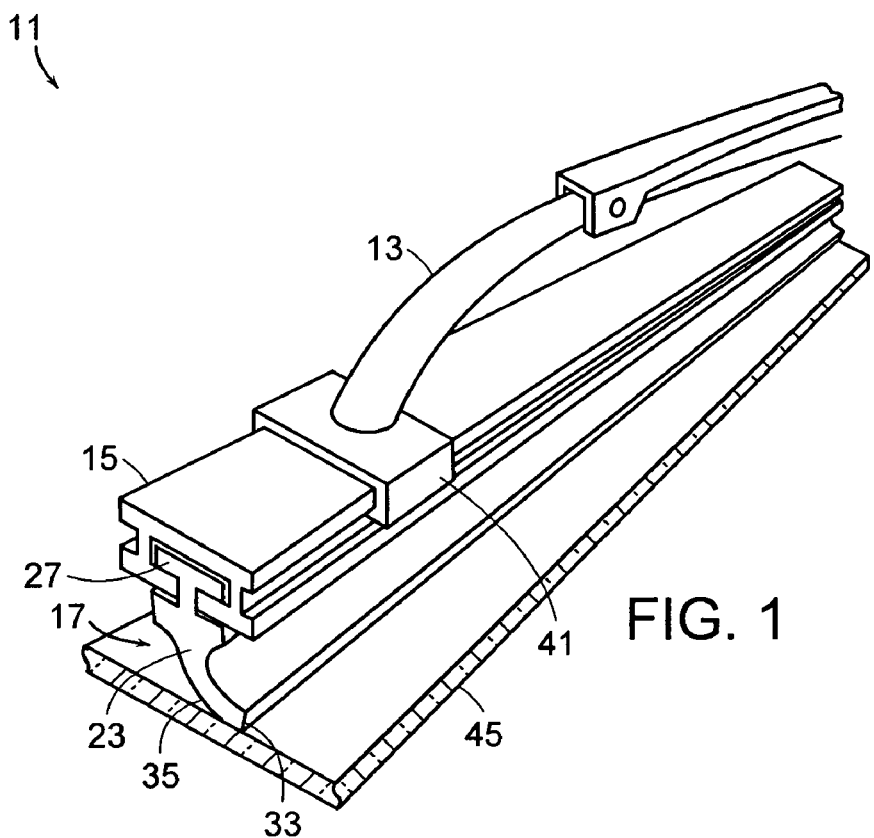
FIG. 1 illustrates a perspective view of a wiper blade according to the present invention, the wiper blade being received by a spline member, which is in turn connected to a wiper frame.
Figure 2:
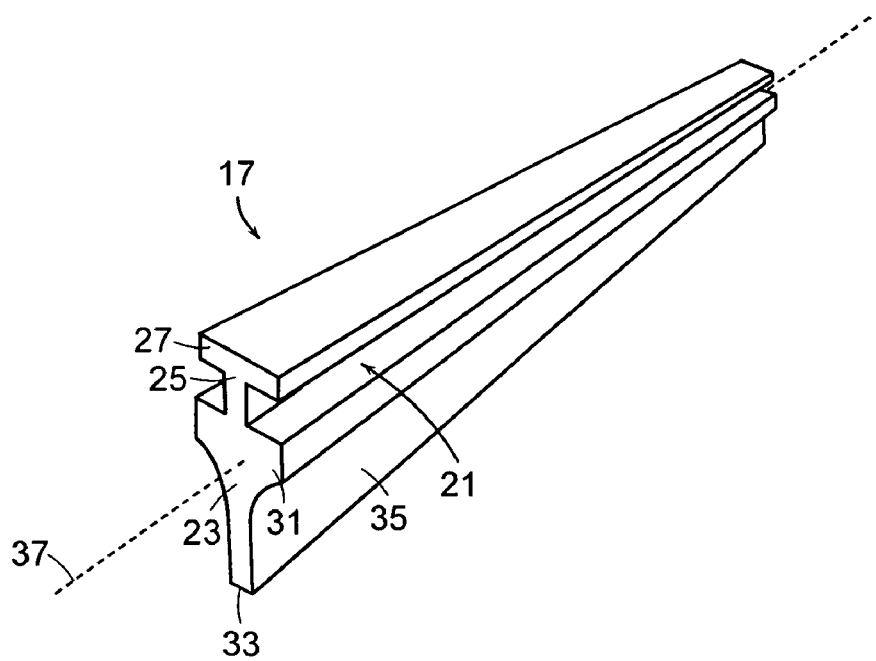
FIG. 2 depicts a perspective view of the wiper blade of FIG. 1.

Referring to FIGS. 1 and 2 in the drawings, a windshield wiper 11 according to the present invention includes a wiper frame 13, a spline member 15, and a wiper blade 17. Wiper blade 17 includes a spline receiving portion 21 and a squeegee member 23. Spline receiving portion 21 includes a thin neck 25, and a relatively thick retainer flange 27 integrally connected to the neck 25.

Squeegee member 23 varies in thickness between a thick base 31 and a relatively thin squeegee blade end 33. In a preferred embodiment, each side 35 of the squeegee member 23 is inwardly arcuate from the base 31 to the squeegee blade end 33. The squeegee member 23 is integrally connected to the neck 25 opposite retainer flange 27. The retainer flange 27, the neck 25, and the squeegee member 23 extend axially along a longitudinal axis 37.

Referring still to FIG. 1 in the drawings, the spline receiving portion 21 of wiper blade 17 is configured to receive spline member 15 along the axial length of the wiper blade 17. Spline member 15 is engaged by a claw 41 connected to wiper frame 13. Movement of wiper frame 13 relative to a windshield 45, or other surface, causes the wiper blade 17 to remove moisture and other debris from the windshield 45.

Referring to FIGS. 3, 4, 5, 6, and 7 in the drawings, various cross-sections of wiper blades are illustrated. Each wiper blade includes spline receiving portion 21, squeegee member 23, and blade end 33.

Figure 3:
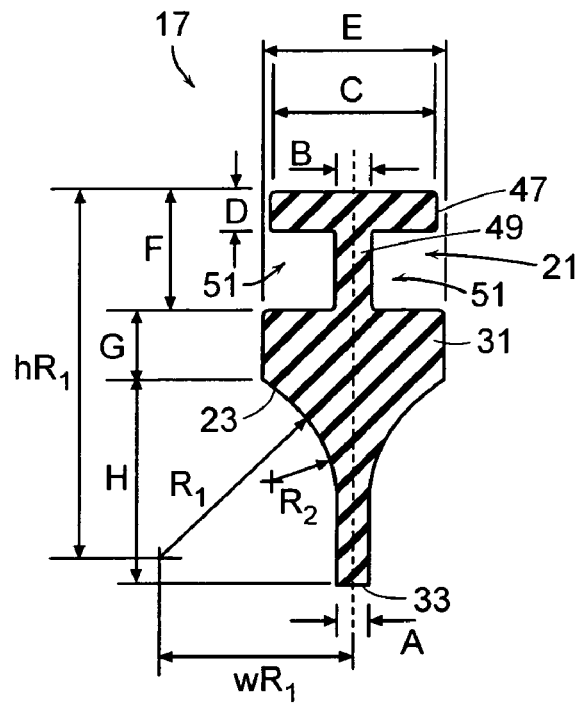
FIG. 3 illustrates a cross-sectional front view of a wiper blade according to the present invention.

Referring more specifically to FIG. 3, a wiper blade 46 includes a retainer flange 47 and a neck 49 defined by longitudinal grooves 51 on either side of neck 49. The longitudinal grooves 51 extend the length of wiper blade 46 on opposite sides of the neck 49. Dimensions A, B, C, D, E, F, G, and H as well as radii $R_1$ and $R_2$ are found in Table 1 below for the wiper blade shown in FIG. 3. Dimensions B, C, D, and F are primarily determined according to the structure of the vehicle wiper frame 13 and spline 15. Dimensions A, G, H, $R_1$, $R_2$, $hR_1$, and $wR_1$ are chosen to give optimum design and wipe quality, and may vary according to the wiper blade composition. For example, length dimensions G and H would be made relatively longer for stiffer compositions, or for compositions having polydiorganosiloxanes with a larger proportion of vinyl side groups in them or having larger amounts of small-sized particulate fillers. The end thickness A will also vary, as will the thickness E of the base 31, according to the relative resiliency of the cured composition.

TABLE 1

Figure 4:
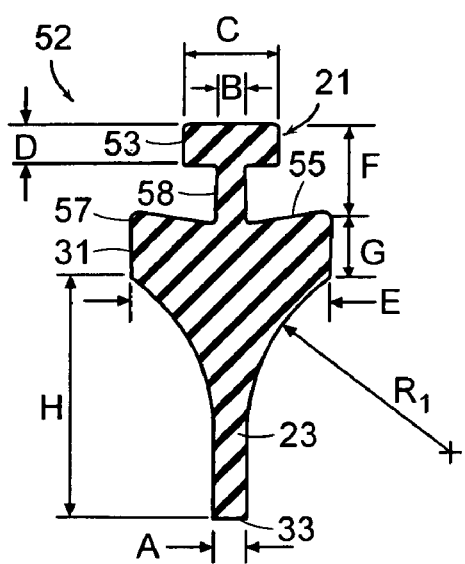
FIG. 4 depicts a cross-sectional front view of another embodiment of a wiper blade according to the present invention.
Figure 5:
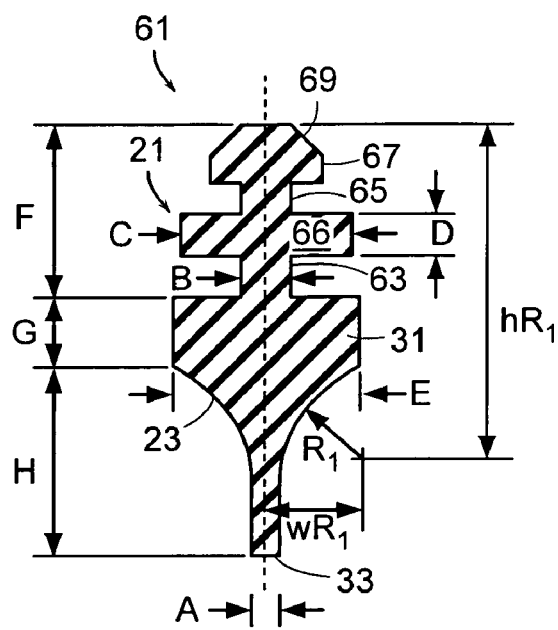
FIG. 5 illustrates a cross-sectional front view of another embodiment of a wiper blade according to the present invention.

| Blade Profile | Dimension, in. | | | | | | | |
|---|---|---|---|---|---|---|---|---|
| | A | B | C | D | E | F | G | H |
| FIG. 3 | .035 | .034 | 180 | .045 | .210 | .140 | .079 | .231 |
| FIG. 4 | .038 | .035 | .110 | .040 | .230 | .100 | .070 | .275 |
| FIG. 5 | 035 | .040 | .220 | .050 | .230 | .195 | .060 | .230 |

| Blade Profile | $R_1$ | $hR_1$ | $wR_1$ | $R_2$ |
|---|---|---|---|---|
| FIG. 3 | .236 | .420 | .229 | .100 |
| FIG. 4 | .246 | .364 | .261 | N/A |
| FIG. 5 | .125 | .377 | .142 | N/A |

Referring now to FIG. 4 in the drawings, a wiper blade 52 includes a retainer flange 53 that is substantially more narrow than the retainer flange 47 illustrated in FIG. 3. A top wall 55 of wiper blade 52 downwardly slopes from a sidewall 57 to a neck 58, instead of being at right angles to neck 58 and sidewall 57. Dimensions A through H, $R_1$, $hR_1$, and $wR_1$ are listed in Table 1 for the wiper blade 52.

A wiper blade 61 having a slightly different cross-section is illustrated in FIG. 5. The preferred dimensions for wiper blade 61 are listed in Table 1. Wiper blade 61 includes a first neck 63 and a second neck 65 of approximately the same dimension. A first retainer flange 66 is disposed between first neck 63 and second neck 65, and a second retainer flange 67 is integrally connected to second neck 65. Second retainer flange 67 has beveled corners 69. The length of the second neck 65 between first retainer flange 66 and second retainer flange 67 is preferably about 0.045 inches. The thickness of the second retainer flange 67 is preferably about 0.055 inches while the thickness of the unbeveled top portion of the second retainer flange 67 is approximately the same dimension as the thicknesses of first neck 63 and second neck 65.

Figure 6:
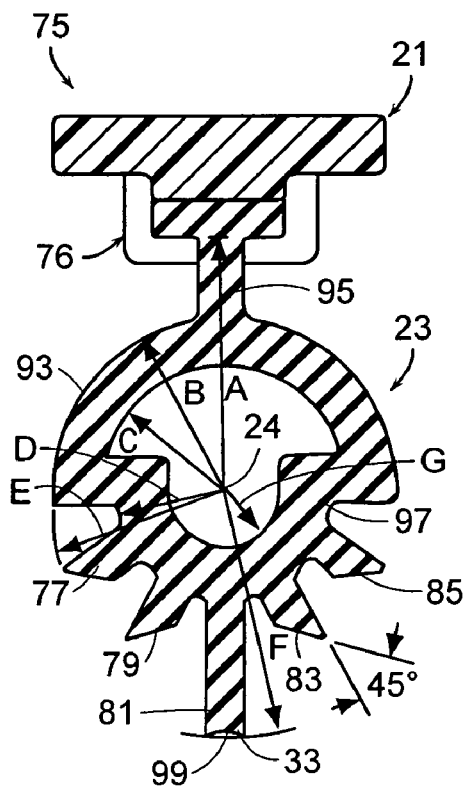
FIG. 6 depicts a cross-sectional front view of another embodiment of a wiper blade according to the present invention.

Referring to FIG. 6 in the drawings, a cross-section of wiper blade 75 is illustrated. Wiper blade 75 is adapted to be received by a wiper blade holder 76. The wiper blade 75 includes five integral ribs 77, 79, 81, 83, and 85 which extend the length of the blade 75 and project generally radially relative to a longitudinal axis of an upper tubular body portion 93. The central rib 81 is a squeegee rib, and the ribs 77, 79 and 83, 85 on opposite sides of the squeegee rib 81 are scraping ribs. The squeegee rib 81 is slightly longer than the scraping ribs 77, 79, 83, and 85.

The dimensional relationships between an upper tubular body portion 93, a neck 95, a lower tubular body portion 97, and ribs 77–85 are important to the proper function of wiper blade 75. The preferred dimensions of the wiper blade are illustrated in Table 2. It should be noted that the angle between the ribs 77, 79, 81, 83, and 85 is approximately 30° and the included angle of the points on the ribs 77, 79, 83, and 85 is approximately 45°. It should also be noted that the squeegee rib 81 has a concave end face 99 at blade end 33 in order to present a relatively sharp edge to the surface being wiped.

TABLE 2

| Blade Profile | Dimension, in. | | | | | | |
|---|---|---|---|---|---|---|---|
| | A | B | C | D | E | F | G |
| FIG. 6 | .300–.315 | .210–.225 | .160 | .165 | .250 | .350 | .095 |

Figure 7:
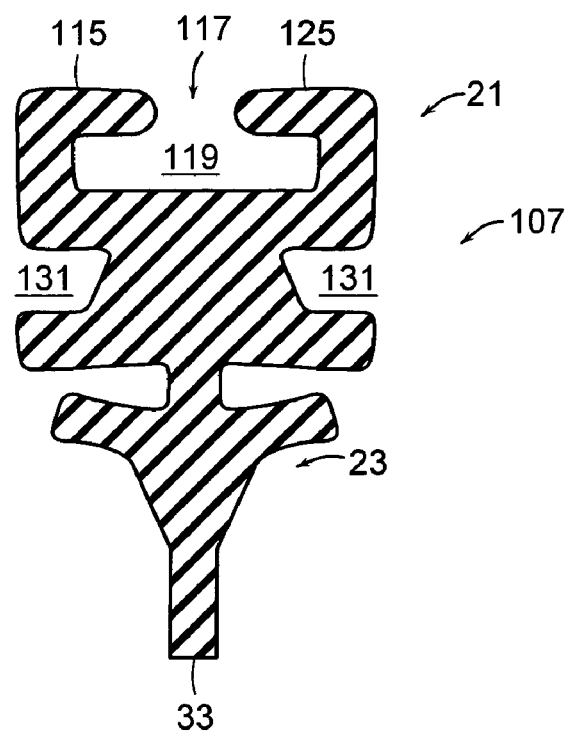
FIG. 7 illustrates a cross-sectional front view of another embodiment of a wiper blade according to the present invention.

Referring to FIG. 7 in the drawings, a cross-sectional view of a wiper blade 107 is illustrated. The spline-receiving portion 21 includes an upper surface 115 having an entry slot 117. A spline channel 119 is disposed within spline-receiving portion 21 and is adjacent to and communicable with entry slot 117. Preferably, both entry slot 117 and spline channel 119 extend the entire length of wiper blade 107 parallel to a longitudinal axis of spline-receiving portion 21. In a preferred embodiment, entry slot 117 is not as wide as spline channel 119, and a retention shoulder 125 is disposed on each side of entry slot 117. Retention shoulders 125 are flexible, and are therefore configured to bend away from entry slot 117 such that a single-rail spline (not shown) can be inserted into spline channel 119. After the single-rail spline is seated within spline channel 119, both retention shoulders 125 rebound to secure the spline within the spline channel 119.

Spline-receiving portion 21 also includes two frame attachment grooves 131 that extend the length of wiper blade 107. Frame attachment grooves 131 are configured to slidingly receive claws similar to claw 41 (see FIG. 1). Protrusions on the claws fit into grooves 131. Although the claws used with some wiper frames are crimped around the wiper blade, with wiper blade 107 it is preferred not to crimp the claws, but instead to allow the wiper blade 107 to slide within the protrusions. When slidingly received by the claws, the wiper blade 107 is further secured with a pair of end caps (not shown). One end cap is installed on each end of wiper blade 107 to prevent wiper blade 107 from sliding out of the grasp of the claws.

A person having skill in the art will recognize that the presence of retention shoulder 125 is not absolutely necessary and that in such a scenario, entry slot 117 would be at least as wide as spline channel 119, and the single-rail spline would most likely be secured by a friction fit between the spline and the walls of the spline channel 119. It is also conceivable that only one retention shoulder 125 is provided that extends from one side of spline-receiving portion 21 and either partially or completely covers the single-rail spline. It is further possible that entry slot 117 be disposed on a surface of spline-receiving portion 21 other than top surface 115. For example, the entry slot 117 could be located on a side surface of spline-receiving portion 21, as long as the entry slot 117 is still communicable with and adjacent to spline channel 119. Finally, in some embodiments, a wiper blade having a single-rail spline similar to wiper blade 107 could be provided without an entry slot 117. In that embodiment, the single-rail spline would be co-extruded or co-molded with the wiper blade so that the single-rail spline was permanently disposed within the spline channel 119.

All of the wiper blades described herein (including wiper blades 17, 52, 61, 75, and 107) are constructed from a silicone rubber formulation that incorporates PTFE powder or another friction-reducing additive directly into the compound. The preferred composition of the silicone rubber formulation of the present invention is shown in Table 3.

TABLE 3

| Material | Weight % |
|---|---|
| Methyl Vinyl Silicone Polymer | 22–55% |
| Filler (Silica, Ca, or other mineral) | 35–50% |
| Friction-reducing additive (PTFE, Graphite, Boron Nitride, or other additive) | 5–42% |
| OH ended Silicone Polymer | 1–15% |
| Cerium Stabilizer | 0.1–1% |
| Acid Acceptor | 0.1–1% |
| Pigment | 0.1–1% |
| Peroxide | 0.5–2% |

As illustrated in Table 3, the friction-reducing additive could include PTFE, graphite, boron nitride, fluoro-polymers, or other fluorine-containing additives. When PTFE is used, a powder form of the compound is added during the compounding stage of the silicone rubber material, which is performed in a Banbury mixer. While a preferred range for the PTFE is between about 5 and 42 weight percent, it has been found that an optimum amount of PTFE is about 11 weight percent. The percentage of PTFE used in the compound, coupled with the average particle size of the PTFE, plays an important part in both the friction reducing properties of the wiper blade and the ability to easily manufacture the wiper blade. The average particle size of the PTFE could be as high as about 25 μm, but it is preferred that the average particle size be below about 6 μm.

An example of PTFE commonly used in preparing the wiper blade compound of the present invention is Polymist F-5A, which can be obtained from Ausimont USA. Polymist F-5A contains particles of a relatively small size, typically below 6 μm. Table 4 illustrates physical properties for Polymist F-5A.

TABLE 4

| Average Particle Size, μm | <6 |
|---|---|
| Specific Surface Area, $m^2/g$ | 3 |
| Specific Gravity at 23° C. | 2.28 |

It should be understood that the correct selection of amount and particle size for the PTFE or other friction-reducing agent is based on the benefit in reduced friction characteristics and the ability to easily manufacture the resulting compound. Although certain amounts of PTFE may provide better friction-reducing qualities to the compound, the plasticity of the resulting compound is sometimes increased to an extent that extrusion and molding of the compound is difficult or impossible. Extrusion of wiper blades is often preferred over molding because the extrusion process is generally quicker and less expensive.

Several tests were conducted using various friction-reducing additives to determine the effect the additives have on the friction characteristics of the final compound. The testing protocol is a relatively standard test in the wiper industry for testing friction coefficients. A sample of test material is placed on a slab of glass, and a 200 g weight is applied to the test material. The amount of force required to pull the material across the glass (the "pulling force") is then measured and recorded. A coefficient of friction is then calculated by dividing the pulling force by the 200 g weight. Each material was tested five times, and an average pulling force was calculated.

Table 5 illustrates the test results for natural rubber and Standard J-7721-1 TRPL, materials commonly used in windshield wiper blades, the latter being used in wiper blades manufactured by JAMAK Fabrication, Inc. The test results illustrated in Table 6 are for silicone compounds that incorporate the listed friction-reducing additive. The friction-reducing additives listed in Table 6 are not intended to represent an exhaustive list of additives that could be used in the compound of the present invention. Instead, these additives are merely examples of some friction-reducing additives, and the values measured during testing give an indication of the friction-reducing qualities that each additive provides.

TABLE 5

| Material | Pulling Force (g) | Calculated Coefficient of Friction |
|---|---|---|
| Natural Rubber | 598.7 | 2.99 |
| Standard J-7721-1 TRPL | 479.4 | 2.40 |

TABLE 6

| Friction-reducing additive | Amount of Additive (pph) | Pulling Force (g) | Calculated Coefficient of Friction |
|---|---|---|---|
| ALGOFLON 203 | 11 | 221.1 | 1.11 |
| CTF5 Boron Nitride | 18 | 140.3 | 0.70 |
| CTUF Boron Nitride | 18 | 99.8 | 0.50 |
| R-020G Graphite | 18 | 131.9 | 0.66 |
| R-182B Graphite | 18 | 127.0 | 0.64 |
| Polymist F5A | 6 | 224.8 | 1.12 |
| Polymist F5A | 9 | 242.6 | 1.21 |
| Polymist F5A | 11 | 187.1 | 0.94 |
| Polymist F5A | 12 | 274.2 | 1.37 |
| Polymist F5A | 15 | 290.3 | 1.45 |
| Polymist F5A | 16 | 186.8 | 0.93 |
| Polymist F5A | 18 | 264.9 | 1.32 |
| Polymist F5A | 100 | 192.0 | 0.96 |
| Polymist F510 | 6 | 308.5 | 1.54 |
| Polymist F510 | 9 | 253.6 | 1.27 |
| Polymist F510 | 11 | 169.5 | 0.85 |
| Polymist F510 | 12 | 268.9 | 1.34 |
| Polymist F510 | 15 | 245.7 | 1.23 |
| Polymist F510 | 18 | 246.4 | 1.23 |
| Polymist XPA213 | 9 | 269.2 | 1.35 |
| Polymist XPA213 | 6 | 276.1 | 1.38 |
| Polymist XPA213 | 11 | 127.2 | 0.64 |
| Polymist XPA213 | 12 | 258.1 | 1.29 |
| Polymist XPA213 | 15 | 224.7 | 1.12 |
| Polymist XPA213 | 18 | 216.1 | 1.08 |
| Polymist F5A & F510 (2.75 & 8.25 pph) | 11 | 141.3 | 0.71 |
| Polymist F5A & F510 (5.5 & 5.5 pph) | 11 | 147.3 | 0.74 |
| Polymist F5A & F510 (8.25 & 2.75 pph) | 11 | 153.5 | 0.77 |
| Polyurethane | 10 | 204.5 | 1.02 |
| Silane Silwet L7607 | 0.2 | 304.2 | 1.52 |
| Silane Silwet L7608 | 0.2 | 295.6 | 1.48 |
| Silane Silwet L77 | 0.2 | 422.6 | 2.11 |

As illustrated in Table 6, the type and amount of friction-reducing additive used with the silicone compound of the present invention significantly affects the frictional properties of the compound. As mentioned previously, the preferred silicone composition includes a PTFE additive of Polymist F5A at 11 weight percent. The small average particle size of this friction-reducing additive reduces the coefficient of friction by approximately 61 percent relative to a typical silicone wiper composition such as Standard J-7721-1 TRPL. Although some of the materials listed above exhibit even better frictional characteristics than Polymist F5A, the issue becomes one of cost and ease of manufacture. For example, the Polymist F5A at 16 weight percent provides slightly better frictional properties, but the increased cost of the additional PTFE is not worth the small gain. A larger gain is obtained by using Boron Nitride or Graphite, but the cost of these materials is much greater than Polymist F5A. Finally, some of the Polymist F510 compounds, or blended compounds containing Polymist F510 and Polymist F5A, exhibit excellent friction characteristics, but the addition of Polymist F510 sometimes makes the final silicone compound more difficult to extrude.

The Polymist F5A additive provides exceptional manufacturing characteristics to the silicone compound of the present invention. Although all of the friction-reducing additives of Table 6 could be used to improve the compound's friction characteristics over standard silicone wiper blade compounds, certain materials exhibit lower plasticity than others. Plasticity is a material property determined when a material sample is subjected to a yield force that causes the material to undergo a permanent change in shape or size (i.e. a plastic deformation). The measured plasticity values for the silicone compound incorporating different friction-reducing additives is illustrated in Table 7.

TABLE 7

| PTFE Additive | Average Particle Size (μm) | Test Loading (pph) | Plasticity (mm/100) |
| --- | --- | --- | --- |
| Polymist F5A | <6 | 11 | 250 |
| Polymist F510 | <20 | 11 | 718 |
| Algoflon 203 | <6 | 11 | 258 |
| Teflon 6C | 480 | 4 | 560 |

The plasticity values listed in Table 7 were measured according to ASTM D531-00 Standard Test Method for Rubber Property-Pusey and Jones Indentation. It is preferable that a plasticity below 400 (mm/100) be used since values above 400 make extrusion, and even molding, of the compound more difficult. The low plasticity associated with Polymist F5A makes it one of the preferred choices as a friction-reducing additive.

Figure 8:
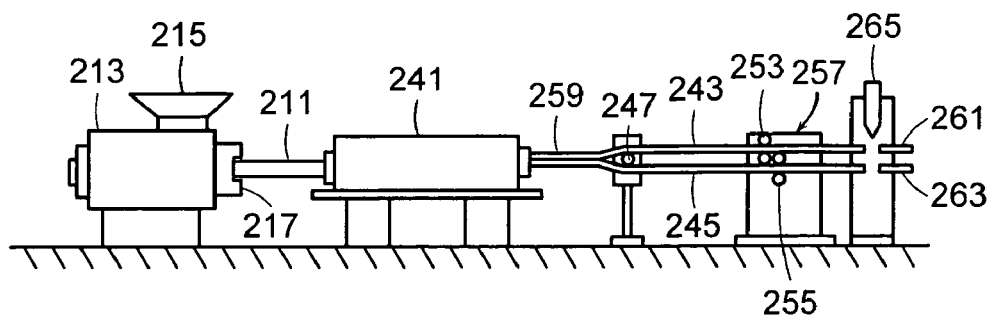
FIG. 8 depicts a side view of an extruder for manufacturing the wiper blade of the present invention.

It is preferred that the wiper blades of the present invention be manufactured by extrusion. Referring to FIG. 8 in the drawings, the first step in the manufacturing process is to extrude a continuous length of curable silicone compound 211 through an extruder 213.

Extruder 213 is a conventional extruder having a hopper 215 which feeds into a hot cylinder. The heat softens the elastomer, and it is forced by one or more spiral screws (not shown) through a die 217 having a die orifice. The die orifice forms a continuous mass of elastomer in the shape of one of the wiper cross sections previously described (see FIGS. 3–7). Extrusion processes of this type are well known in the art.

Figure 9:
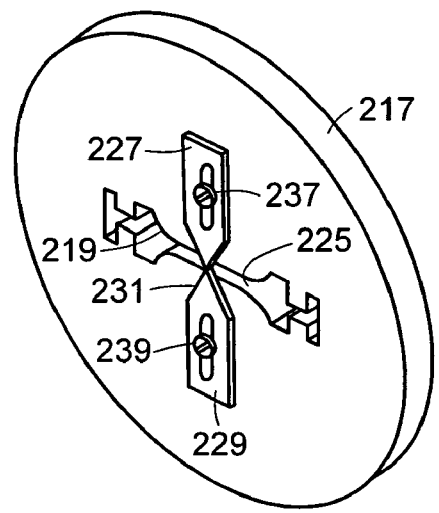
FIG. 9 illustrates a perspective view of a die used with the extruder of FIG. 8.
Figure 10:
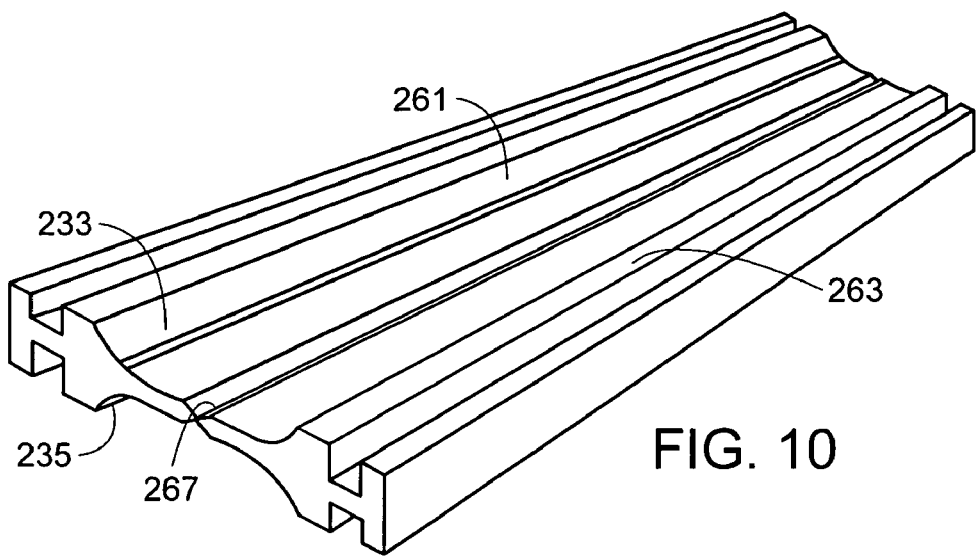
FIG. 10 depicts a perspective view of a pair of wiper-sized segments of cured silicone elastomer according to the present invention.

Referring to FIGS. 9 and 10 in the drawings, a detailed view of die 217 includes a die opening 219 which is shaped to produce a pair of wiper blades joined at a mid-section thereof in edge-to-edge relation. The die 217 includes an adjustable scoring mechanism, such as adjustable blades 227, 229. Blade tips 231 disposed on each adjustable blade 227, 279 are not in contact, but are spaced apart a preselected distance to score the continuous length of elastomer 211 along a top and bottom surface 233, 235 of the wiper blade to a depth less than the thickness of the elastomer (see FIG. 10). The blades 227, 229 can be adjusted by means of screws 237, 239 mounted on the die which are carried in vertical slots provided in the blades 227, 229.

The continuous length of extruded elastomer 211 is passed to a curing station 241. In the embodiment shown in FIG. 8, curing station 241 is a continuous vulcanizer. It is readily understood by those skilled in the art that the continuous vulcanizer 241 can employ, for instance, a liquid medium such as a eutectic salt bath having liquid salt at a temperature from about 350° to 450° F. The viscosity of the salt at these operating temperatures is similar to water.

It will also be apparent that instead of the preferred salt bath, any continuous vulcanizing method could be used. For example, the vulcanizing step could easily be performed by a hot air vulcanizing tunnel. Also, the continuous length of elastomer 211 could be cured without a heat activated catalyst, instead using infrared radiation or gamma radiation techniques familiar to those skilled in the art. It is only necessary that the previously formed and scored curable elastomer be cured such that the material can be divided and formed as subsequently described.

After curing, a continuous length of cured elastomer 259 is separated into two separate lengths of wiper blade 243, 245 by allowing one length 243 to travel over a fixed nip roller 247 while the second length 245 is pulled under the same nip roller 247. The beginning separation can be accomplished by hand with the ends of the wiper blade being engaged by roller pairs 253, 255 of a puller 257. Preferably, the separation of cured elastomer 259 occurs at an elevated temperature above ambient. Leaving the extruder 213, the curable elastomer 211 is typically at a temperature in the range from about 90°–100° F. The continuous vulcanizing step then typically raises the temperature to a higher elevation above ambient. For instance, in the case of a salt bath or hot air vulcanizing tunnel, the cured elastomer 259 would be at an elevated temperature on the order of 300°–450° F. The preferred temperature for the cured elastomer 259 at the separating roller 247 is in the range from about 100°–300° F., most preferably about 200° F. The decrease in temperature between the continuous vulcanizer 241 and the separating roller 247 can be achieved by exposure to the ambient atmosphere, or by pulling cured elastomer 259 through a water trough with water at ambient temperature, or by exposing cured elastomer 259 to a plurality of air jets.

Referring still to FIGS. 9 and 10, the separate continuous lengths of wiper blade 243, 245 are cut transversely into individual wiper-sized segments 261, 263 by a conventional cutter 265. FIG. 10 is a perspective view of a pair of wiper-sized segments 261, 263, the segments being separated by an opening 267 located at the approximate mid-section which formerly represented the score line prior to separation at the nip roller 247.

Figure 11:
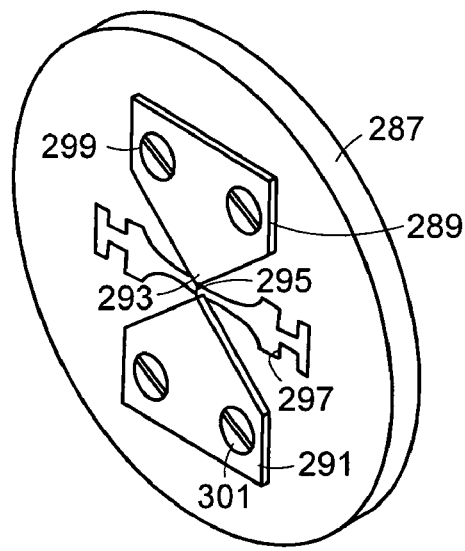
FIG. 11 illustrates a perspective view of an alternative die used with the extruder of FIG. 8.

Referring to FIG. 11 in the drawings, another embodiment of an extrusion die 287 is illustrated. Die 287 includes blades 289, 291, the blade tips 293 of which are not in contact but are spaced apart a preselected distance. In this case, however, a preforming means, such as wire 295, extends between the blades 289, 291 to preform a mid-section 298 of an extruded elastomer 297 by weakening the mid-section. The blades 289, 291 are fixed on the die face by means of screw sets 299, 301, with wire 295 being, for instance, tack welded thereon. The preforming means could also comprise, for instance, a Kevlar blade arranged between the die blades 289, 291. By passing the raw extruded elastomer through die 287 and preforming means 295, the elastomer reunites, or tacks together, immediately after passing the wire 295. The continuous length of uncured, extruded elastomer 297 is then passed to a curing station and cured in the manner previously discussed.

After curing, a continuous length of cured elastomer is separated into two separate lengths of wiper blade (similar to lengths 243, 245 in FIG. 8) by allowing one length of wiper blade to travel over a fixed nip roller 247 while a second length of wiper blade is pulled under the same roller 247. The lengths can then be engaged by roller pairs 253, 255 of a puller 257, as previously discussed. The cured elastomer separates along the preformed mid-section 298 into separate lengths of wiper blade having improved edge quality. The extrusion process allows a continuous length of blade to be formed at a lower cost than most molding techniques.

Figure 12:
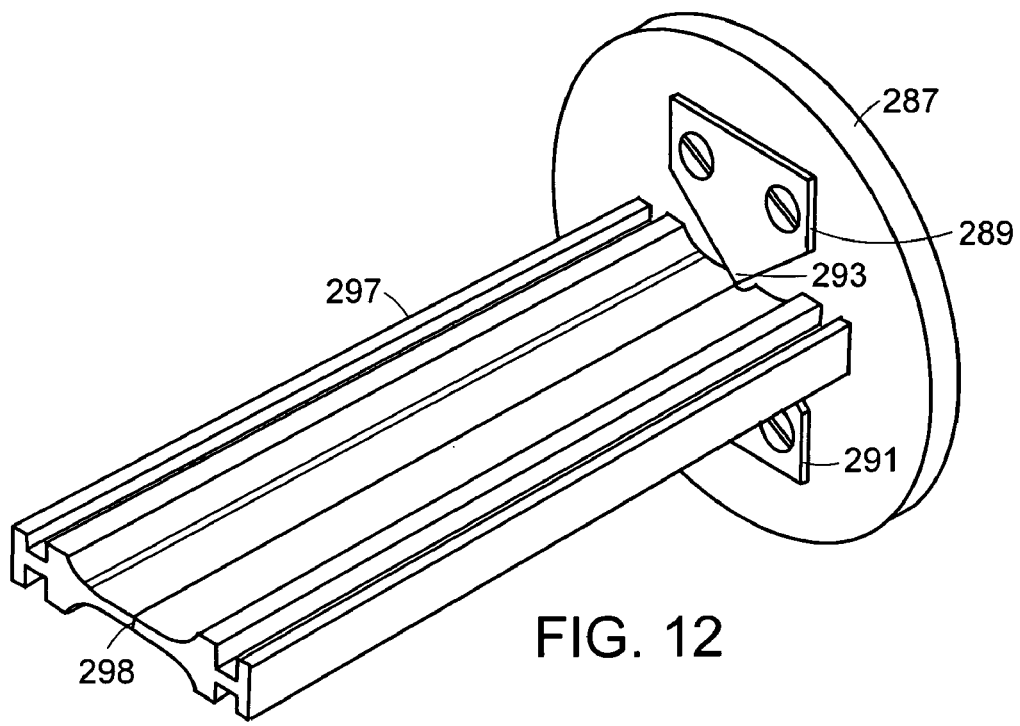
FIG. 12 depicts a perspective view of an elastomer being extruded through the die of FIG. 11.

The fabrication process described in conjunction with FIGS. 11 and 12 is useful for wiper blades having a specific gravity of less than or equal to about 1.40. For blade compositions having a specific gravity of greater than 1.40 the extrusion process is modified such that no Kevlar wire or filament 295 is used to preform a weakened midsection. Instead, the blades are extruded and are passed directly to the continuous vulcanizer 241 (see FIG. 8). Thereafter, the blades are separated not by the nip rollers as shown, but by a circular blade. After separation, the blades are cut transversely by a conventional cutter 265.

The silicone rubber composition of the present invention is ideally suited for extrusion into wiper blades of many different cross sections. Although the extrusion process has been described in detail with reference to FIGS. 8–12, it will be understood by those of skill in the art that any extrusion process could be used to form the wiper blades of the present invention. It will be further understood that other manufacturing processes, including without limitation compression molding, injection molding, and blow molding, could be employed to form the wiper blades.

A primary advantage of the silicone composition and wiper blade of the present invention are the superior friction properties imparted to the wiper blade. The reduced friction between wiper blade and wiped surface reduces chatter on the wiped surface during use and improves performance of the wiper blade. The composition also greatly reduces wiper edge wear and improves tear resistance properties, which increases the overall life of the wiper blade. In addition to these exceptional properties, the silicone rubber formulation retains the desirable properties often associated with silicone, namely resistance to UV, ozone, and extreme temperatures.

Another advantage of incorporating PTFE or other friction-reducing additives during the compounding stage is that the compound "blooms" or migrates to the surface of the wiper blade and continues to provide reduced friction characteristics over time. This is an improvement over wiper blades that have been coated with PTFE, since PTFE coatings tend to erode over time, thereby adversely affecting the wiper blade's frictional characteristics.

A person having ordinary skill in the art will recognize that various forms and grades of PTFE could be added during the compounding stage, including PTFE in non-powder form and grades other than the Polymist F-5A described above. Alternative friction-reducing agents could also be used, including without limitation boron nitride and graphite.

Even though many of the examples discussed herein are applications of the present invention in windshield wiper blades, the present invention also can be applied to other devices that need a flexible material having superior tear resistance and reduced friction characteristics. Some examples of possible further uses include but are not limited to squeegees for cleaning windows, medical tubing such as peristaltic pump tubing, and materials for various sealing applications.

It should be apparent from the foregoing that an invention having significant advantages has been provided. While the invention is shown in only a few of its forms, it is not just limited but is susceptible to various changes and modifications without departing from the spirit thereof.

We claim:

1. A windshield wiper comprising:
   a frame adapted to be attached to a vehicle;
   a wiper blade attached to the frame; and
   wherein the wiper blade is made from a mixture including a methyl vinyl silicone polymer from about 22 to 55 weight percent, a filler from about 35 to 50 weight percent, and polytetrafluoroethylene having an average particle size of less than 25 μm and in an amount of from about 11 to 42 weight percent.

2. A windshield wiper according to claim 1, wherein the polytetrafluoroethylene has an average particle size of less than 6 μm.

3. A windshield wiper according to claim 1, wherein the filler is a mineral.

4. A windshield wiper according to claim 1, wherein the filler is selected from the group consisting of silica and calcium.

5. A windshield wiper according to claim 1, wherein the mixture further comprises:
   hydroxyl-terminated silicone polymer from about 1 to 15 weight percent;
   a cerium stabilizer from about 0.1 to 1 weight percent;
   acid acceptor from about 0.1 to 1 weight percent;
   pigment from about 0.1 to 1 weight percent; and
   peroxide from about 0.5 to 2 weight percent.

6. A method for manufacturing a wiper blade comprising the steps of:
   compounding a mixture comprising from about 22 to 55 weight percent of a methyl vinyl silicone polymer, from about 35 to 50 weight percent of a filler, and from about 11 to 42 weight percent of polytetrafluoroethylene having an average particle size of less than 25 μm; and
   forming the wiper blade from the mixture.

7. A method for manufacturing a wiper blade according to claim 6, wherein the polytetrafluoroethylene has an average particle size of less than 6 μm.

8. A method for manufacturing a wiper blade according to claim 6, wherein the filler is a mineral.

9. A method for manufacturing a wiper blade according to claim 6, wherein the filler is selected from the group consisting of silica and calcium.

10. A method for manufacturing a wiper blade according to claim 6, wherein the mixture further comprises:
    hydroxyl-terminated silicone polymer from about 1 to 15 weight percent;
    a cerium stabilizer from about 0.1 to 1 weight percent;
    acid acceptor from about 0.1 to 1 weight percent;
    pigment from about 0.1 to 1 weight percent; and
    peroxide from about 0.5 to 2 weight percent.

11. A method for manufacturing a wiper blade according to claim 6, wherein the wiper blade is formed by an extrusion process.

12. A method for manufacturing a wiper blade according to claim 6, wherein the wiper blade is formed by a molding process.

13. A windshield wiper according to claim 1, wherein the polytetrafluoroethylene is present in an amount of about 11 weight percent.

14. A method for manufacturing a wiper blade according to claim 6, wherein the polytetrafluoroethylene is present in an amount of about 11 weight percent.

* * * * *